(12) United States Patent
Wu et al.

(10) Patent No.: US 11,295,115 B2
(45) Date of Patent: Apr. 5, 2022

(54) METHOD AND DEVICE FOR GENERATING FACE IMAGE, ELECTRONIC DEVICE AND COMPUTER READABLE STORAGE MEDIUM

(71) Applicant: BOE TECHNOLOGY GROUP CO., LTD., Beijing (CN)

(72) Inventors: Yanhong Wu, Beijing (CN); Guannan Chen, Beijing (CN); Lijie Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/937,175

(22) Filed: Jul. 23, 2020

(65) Prior Publication Data
US 2021/0049350 A1 Feb. 18, 2021

(30) Foreign Application Priority Data
Aug. 15, 2019 (CN) .......................... 201910753429.0

(51) Int. Cl.
G06K 9/00 (2006.01)

(52) U.S. Cl.
CPC ..... *G06K 9/00268* (2013.01); *G06K 9/00302* (2013.01)

(58) Field of Classification Search
CPC .......... G06K 9/00268; G06K 9/00302; G06K 9/6211; G06K 9/4609; G06K 9/00281;
(Continued)

(56) References Cited

U.S. PATENT DOCUMENTS

2012/0162356 A1* 6/2012 Van Bree ................ G06T 11/60
                                                       348/14.16
2012/0328198 A1* 12/2012 Takahashi .......... G06K 9/00281
                                                       382/195
(Continued)

FOREIGN PATENT DOCUMENTS

CN    104616347 A    5/2015
CN    108509846 A    9/2018

OTHER PUBLICATIONS

Sheu, et al., "Automatic Generation of Facial Expression Using Triangular Geometric Deformation", Journal of Applied Research and Technology, vol. 12, pp. 1115-1130, Dec. 2014.
(Continued)

*Primary Examiner* — Nimesh Patel
(74) *Attorney, Agent, or Firm* — Nath, Goldberg & Meyer; Joshua B. Goldberg

(57) ABSTRACT

The present disclosure discloses a method for generating a face image, an electronic device, and a non-transitory computer-readable storage medium, the method includes: receiving a first face image and target facial expression information, and determining first facial expression information corresponding to the first face image; selecting a first reference face image matched with the first facial expression information and a second reference face image matched with the target facial expression information from a face image library; respectively extracting feature points in the first reference face image and the second reference face image, and determining face deformation information between the first reference face image and the second reference face image based on the feature points; and extracting feature points in the first face image, and generating a second face image based on the face deformation information and the feature points in the first face image.

20 Claims, 11 Drawing Sheets

(58) Field of Classification Search
CPC .......... G06K 9/00906; G06K 9/00275; G06K 9/00295; G06K 9/627; G06K 2009/00932; G06K 9/00026; G06K 9/00288; G06K 9/6255; G06K 9/00577; G06K 9/00892; G06K 9/00979; G06K 2009/00738; G06K 9/00006; G06K 9/00617; G06K 9/00711; G06K 9/00771; G06K 9/00087; G06K 9/00335; G06K 9/00369; G06K 9/00718; G06K 9/3233; G06K 9/6218; G06K 9/6262; G06T 11/00; G06T 3/0006; G06T 3/0075; G06T 2207/30201; G06N 3/04; G06F 21/32; G06F 21/31; G06F 21/6245; G06F 2221/2113; G06F 2221/2149; G06F 21/606; H04L 12/282; H04L 63/0853; H04L 63/0861; H04L 41/28; H04L 63/00; H04L 63/0407; H04L 9/3231; H04L 2463/082; H04L 63/105; H04L 63/107; H04W 12/06; H04W 12/68; H04W 12/068; H04W 12/80; H04W 4/021; H04W 4/029; H04W 4/90
See application file for complete search history.

(56) References Cited

U.S. PATENT DOCUMENTS

| | | | |
|---|---|---|---|
| 2013/0222644 A1* | 8/2013 | Son | G06K 9/00248 348/239 |
| 2016/0358318 A1* | 12/2016 | Zhang | G06K 9/00288 |
| 2018/0204052 A1* | 7/2018 | Li | G06K 9/6206 |
| 2018/0300557 A1* | 10/2018 | Rodenas | G11B 27/10 |
| 2020/0058171 A1* | 2/2020 | Du | G06T 19/20 |

OTHER PUBLICATIONS

Tsai, et al., "Facial Expression Synthesis Based on Imitation", International Journal of Advanced Robotic Systems, vol. 9, No. 148, pp. 1-6, 2012.

First Office Action dated Jul. 20, 2021 corresponding to Chinese application No. 201910753429.0.

* cited by examiner

METHOD AND DEVICE FOR GENERATING FACE IMAGE, ELECTRONIC DEVICE AND COMPUTER READABLE STORAGE MEDIUM

CROSS-REFERENCE TO RELATED APPLICATIONS

The present disclosure claims the priority of Chinese Patent Application No. 201910753429.0, filed on Aug. 15, 2019, the contents of which are incorporated herein in their entirety by reference.

TECHNICAL FIELD

The present disclosure relates to the field of image processing technology, and in particular, to a method and a device for generating a face image, an electronic device capable of implementing the method for generating the face image, and a computer-readable storage medium storing computer instructions for enabling a computer to execute the method for generating the face image.

BACKGROUND

With rapid development of image processing technology, facial expression synthesis is applied to many technical fields, such as virtual technology, movies, games, face recognition, and the like. At present, a method for synthesizing facial expressions mainly adopts a compression coding standard MPEG-4 or a facial action coding system and the like to synthesize the facial expressions, in the related technology, a selection of facial features from an inputted image generally needs manual operations, or a method for dividing a facial area needs manual operations, and since the selection of facial features by the manual operations and the dividing of the facial area by the manual operations are not fine enough, resulting in a synthesized facial expression image with details not rich enough, and a quality of the facial expression image is poor.

SUMMARY

In a first aspect, an embodiment of the present disclosure provides a method for generating a face image, the method includes:

receiving a first face image inputted and target facial expression information, and determining first facial expression information corresponding to the first face image;

selecting a first reference face image matched with the first facial expression information and a second reference face image matched with the target facial expression information from a face image library based on the first facial expression information and the target facial expression information;

respectively extracting feature points in the first reference face image and the second reference face image, and determining face deformation information between the first reference face image and the second reference face image based on the feature points;

extracting feature points in the first face image, and generating a second face image based on the face deformation information and the feature points in the first face image, wherein the second face image is matched with the target facial expression information.

In some implementations, the determining the first facial expression information corresponding to the first face image includes:

generating a feature vector corresponding to the first face image according to the feature points in the first face image;

determining first facial expression information, which corresponds to the feature vector corresponding to the first face image, based on a preset relationship between the feature vector and the facial expression information.

in some implementations, the respectively extracting feature points in the first reference face image and the second reference face image includes:

respectively extracting first feature points in the first reference face image and the second reference face image based on a Dlib library, wherein the first feature points refer to feature points representing a contour of a facial organ of a face;

respectively extracting second feature points in the first reference face image and the second reference face image according to the first feature points and an interpolation algorithm, wherein the second feature points are different from the first feature points.

In some implementations, the respectively extracting the second feature points in the first reference face image and the second reference face image according to the first feature points and the interpolation algorithm includes:

determining a connection line for connecting any two of the first feature points in the first reference face image or the second reference face image, determining a midpoint of the connection line as the second feature point; or determining an intersection point of any two connection lines for connecting the first feature points in the first reference face image or the second reference face image, as the second feature point; or selecting at least three non-collinear feature points from the first feature points, and determining a fitting curve corresponding to the at least three feature points according to a preset fitting polynomial and the at least three feature points; and sampling on the fitting curve to obtain the second feature points.

In some implementations, the determining the face deformation information between the first reference face image and the second reference face image based on the feature points includes:

determining a first feature vector corresponding to the first reference face image based on the feature points corresponding to the first reference face image, and determining a second feature vector corresponding to the second reference face image based on the feature points corresponding to the second reference face image;

determining a difference value between the first feature vector and the second feature vector, and obtaining the face deformation information based on the difference value.

In some implementations, the generating the second face image based on the face deformation information and the feature points in the first face image includes:

adjusting positions of the feature points in the first face image based on the face deformation information;

generating the second face image according to the feature points subjected to the adjusting.

In some implementations, the adjusting the positions of the feature points in the first face image based on the face deformation information includes:

performing affine transformation on the feature points in the first face image by taking the first reference face image as a reference, and aligning the feature points at corresponding positions of the first face image and the first reference face image;

determining positions of the feature points in the first face image subjected to the aligning, and adjusting the positions of the feature points in the first face image subjected to the aligning based on the face deformation information.

In some implementations, the generating the second face image according to the feature points subjected to the adjusting includes:

connecting the feature points subjected to the adjusting based on a triangulation algorithm to form a triangular chain network;

performing texture filling and inverse affine transformation in the triangular chain network to obtain the second face image.

In a second aspect, an embodiment of the present disclosure provides a device for generating a face image, including:

a determining unit configured to receive a first face image inputted and target facial expression information and determine first facial expression information corresponding to the first face image;

a selecting unit configured to select a first reference face image matched with the first facial expression information and a second reference face image matched with the target facial expression information from a face image library based on the first facial expression information and the target facial expression information;

an extracting unit configured to extract feature points in the first reference face image and the second reference face image, respectively, and determine face deformation information between the first reference face image and the second reference face image based on the feature points;

a generating unit configured to extract feature points in the first face image, and generate a second face image based on the face deformation information and the feature points in the first face image, wherein the second face image is matched with the target facial expression information.

In some implementations, the determining unit is configured to:

generating a feature vector corresponding to the first face image according to the feature points in the first face image;

determining first facial expression information, which corresponds to the feature vector corresponding to the first face image, based on a preset relationship between the feature vector and the facial expression information.

In some implementations, the extracting unit is configured to:

respectively extracting first feature points in the first reference face image and the second reference face image based on a Dlib library, wherein the first feature points refer to feature points representing a contour of a facial organ of a face;

respectively extracting second feature points in the first reference face image and the second reference face image according to the first feature points and an interpolation algorithm, wherein the second feature points are different from the first feature points.

In some implementations, the extracting unit is configured to:

determining a connection line for connecting any two of the first feature points in the first reference face image or the second reference face image, determining a midpoint of the connection line as the second feature point; or determining an intersection point of any two connection lines for connecting the first feature points in the first reference face image or the second reference face image, as the second feature point; or selecting at least three non-collinear feature points from the first feature points, and determining a fitting curve corresponding to the at least three feature points according to a preset fitting polynomial and the at least three feature points; and sampling on the fitting curve to obtain the second feature points.

In some implementations, the determining unit is configured to:

determining a first feature vector corresponding to the first reference face image based on the feature points corresponding to the first reference face image, and determining a second feature vector corresponding to the second reference face image based on the feature points corresponding to the second reference face image;

determining a difference value between the first feature vector and the second feature vector, and obtaining the face deformation information based on the difference value.

In some implementations, the generating unit is configured to:

adjusting positions of the feature points in the first face image based on the face deformation information;

generating a second face image according to the feature points subjected to the adjusting In some implementations, the generating unit is configured to:

performing affine transformation on the feature points in the first face image by taking the first reference face image as a reference, and aligning the feature points at corresponding positions of the first face image and the first reference face image;

determining positions of the feature points in the first face image subjected to the aligning, and adjusting the positions of the feature points in the first face image subjected to the aligning based on the face deformation information.

In some implementations, the generating unit is configured to:

connecting the feature points subjected to the adjusting based on a triangulation algorithm to form a triangular chain network;

performing texture filling in the triangular chain network, and performing inverse affine transformation to obtain the second face image.

in a third aspect, the present disclosure provides an electronic device, including:

a memory for storing instructions to be executed by at least one processor;

a processor for executing the instructions stored in the memory to perform the method of the first aspect.

In a fourth aspect, the present disclosure provides a non-transitory computer-readable storage medium storing computer instructions which, when executed on a computer, cause the computer to perform the method of the first aspect.

DESCRIPTION OF EMBODIMENTS

The embodiments described in this application are only a portion of embodiments of the present disclosure, and not all of embodiments. All other embodiments obtained by those ordinary skilled in the art based on the embodiments in the present disclosure without making any creative effort are considered falling into the protection scope of the present disclosure.

In order to better understand technical solutions of the present disclosure, the technical solutions of the present disclosure are detailed below by accompanying drawings and specific embodiments, and it should be understood that the embodiments and specific features in the embodiments of the present disclosure are detailed descriptions of the technical solutions of the present disclosure, and are not limitations of the technical solutions of the present disclosure, and the technical features in the embodiments and the embodiments of the present disclosure may be arbitrarily combined with each other without conflict.

Figure 1:
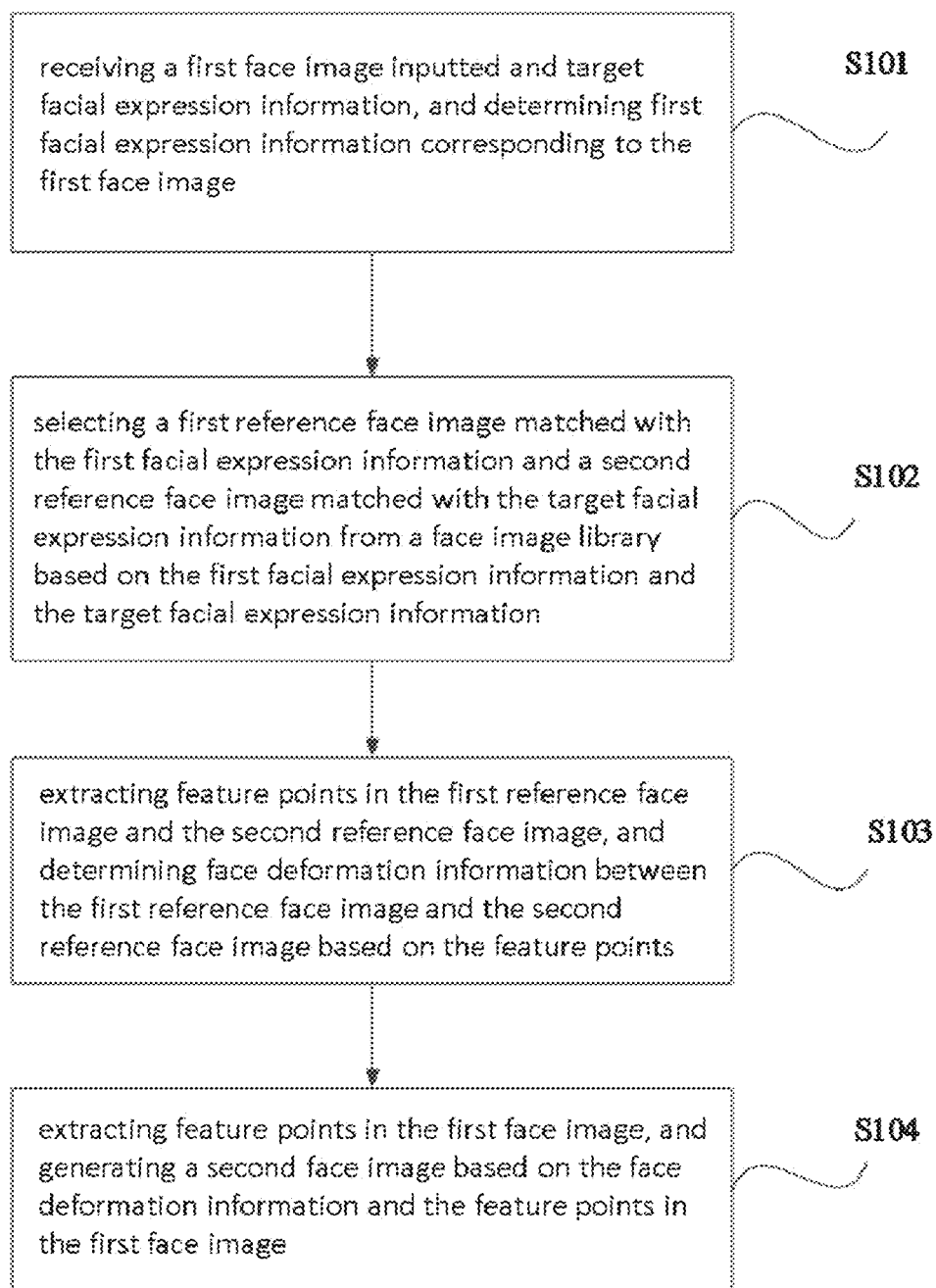
FIG. 1 is a schematic flowchart of a method for generating a face image according to an embodiment of the present disclosure.

A method for generating a face image according to an embodiment of the present disclosure is described in detail below with reference to the drawings, and as shown in FIG. 1, the method may include the following steps 101 to 104.

Step 101, receiving, by an electronic device, a first face image inputted and target facial expression information, and determining first facial expression information corresponding to the first face image.

For example, the target facial expression information may be emotion information such as happy, sad or angry, and may also include other information capable of characterizing an expression, such as an eye gazelle, a mouth gazelle, and the like, which are not limited herein. After receiving the first face image inputted, the electronic device needs to determine first facial expression information corresponding to the first face image, and there are various ways to determine the first facial expression information.

For example, determining the first facial expression information corresponding to the first face image includes:

generating a feature vector corresponding to the first face image according to feature points in the first face image; determining first facial expression information, which corresponds to the feature vector corresponding to the first face image, based on a preset relationship between the feature vector and the facial expression information.

Specifically, a plurality of feature points in the first face image are extracted, the extracted feature points are numbered, and based on a sequence of numbers of the feature points, coordinates of the positions of the feature points are converted into a feature vector, so that the feature vector corresponding to the first face image is obtained.

Further, after the feature vector corresponding to the first face image is obtained, the first facial expression information which corresponds to the feature vector corresponding to the first face image is determined based on the preset relationship between the feature vector and the facial expression information stored in a database.

It should be understood that the electronic device may be a computer, a terminal, a server, or the like, and that all devices having data processing capability are suitable for the present disclosure.

Step 102, selecting, by the electronic device, a first reference face image matched with the first facial expression information and a second reference face image matched with the target facial expression information from a face image library based on the first facial expression information and the target facial expression information.

Specifically, a plurality of reference face images with different facial expression information are stored in a face image library of the electronic device in advance, after the first face expression information corresponding to the first face image is determined, the electronic device selects two reference face images from the face image library based on the first face expression information and target facial expression information, wherein the two reference face images include a first reference face image and a second reference face image, the facial expression information corresponding to the first reference face image is the same as the first face expression information, and the facial expression information corresponding to the second reference face image is the same as the target facial expression information.

Figure 2A:
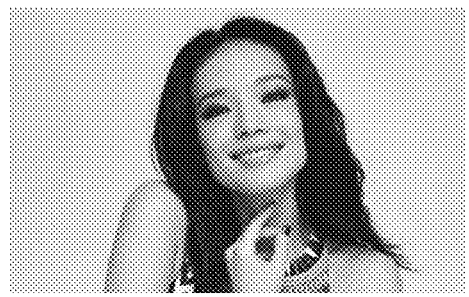
FIG. 2a is a schematic diagram of an input face image according to an embodiment of the present disclosure.
Figure 2B:
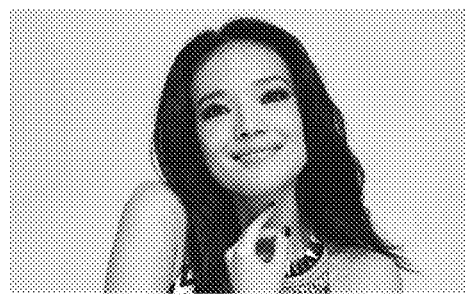
FIG. 2b is a face image corresponding to target facial expression information according to an embodiment of the present disclosure.
Figure 2C:
FIG. 2c is a reference face image corresponding to an input face image according to an embodiment of the present disclosure.
Figure 2D:
FIG. 2d is a reference face image corresponding to target facial expression information according to an embodiment of the present disclosure.

For example, as shown in FIGS. 2a, 2b, 2c and 2d, FIG. 2a shows a first face image inputted; FIG. 2b shows a second face image corresponding to the target facial expression information; FIG. 2c shows a first reference face image; FIG. 2d shows a second reference face image. The facial expression information corresponding to FIGS. 2a and 2c is a mouth opening, and the facial expression information corresponding to FIGS. 2b and 2d is a mouth shutting.

Step 103, respectively extracting, by the electronic device, feature points in the first reference face image and the second reference face image, and determining face deformation information between the first reference face image and the second reference face image based on the feature points.

Specifically, after determining the first reference face image and the second reference face image from the face image library, the electronic device extracts feature points in the first reference face image and the second reference face image, where there are multiple ways of extracting the feature points in the face images, and one way is described below as an example, For example, the respectively extracting the feature points in the first reference face image and the second reference face image includes: respectively extracting first feature points in the first reference face image and the second reference face image based on a Dlib library, wherein the first feature points refer to feature points representing a contour of a facial organ of a face; and respectively extracting second feature points in the first reference face image and the second reference face image according to the first feature points and an interpolation algorithm, wherein the second feature points are different from the first feature points.

Figure 3:
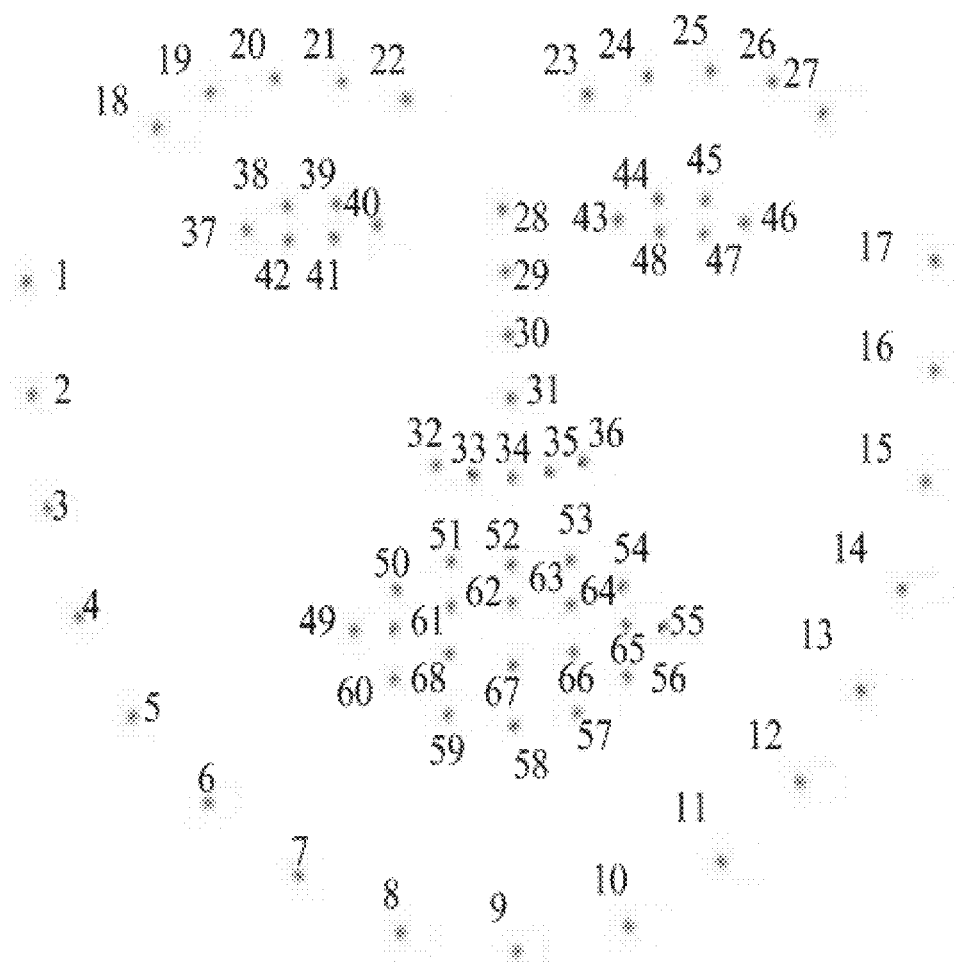
FIG. 3 is a distribution diagram of feature points in a Dlib library according to an embodiment of the present disclosure.

Specifically, there are various algorithms for extracting the feature points of the face images, such as the Dlib library or an OpenCV algorithm. The process of extracting the feature points of the face images is described below by taking the Dlib library as an example. The Dlib library includes sixty-eight feature points of a preset contour of a facial organ of a human face, and FIG. 3 shows a distribution diagram of the sixty-eight feature points in the Dlib library, where the sixty-eight feature points are numbered 1 to 68. Firstly, sixty-eight first feature points of the contour of the facial organ are extracted from the first reference face image and the second reference face image according to the Dlib library, and then second feature points different from the sixty-eight feature points are respectively extracted from the first reference face image and the second reference face image according to the first feature points and an interpolation algorithm, wherein the interpolation algorithm is various, and may be a straight line interpolation, a parabolic line fitting interpolation or any other interpolation algorithm, and is not limited here.

Further, there are various ways to extract the second feature points from the face images according to the first feature points and the interpolation algorithm, and the following description will be given by taking three ways as an example.

In a first way, a connection line for connecting any two of the first feature points in the first reference face image or the second reference face image is determined, a midpoint of the connection line is determined as the second feature point.

Specifically, first, two feature points are selected from the sixty-eight feature points extracted from the Dlib library, and then the two feature points selected are connected by a line segment, and the midpoint of the line segment is determined as the second feature point.

Figure 4:
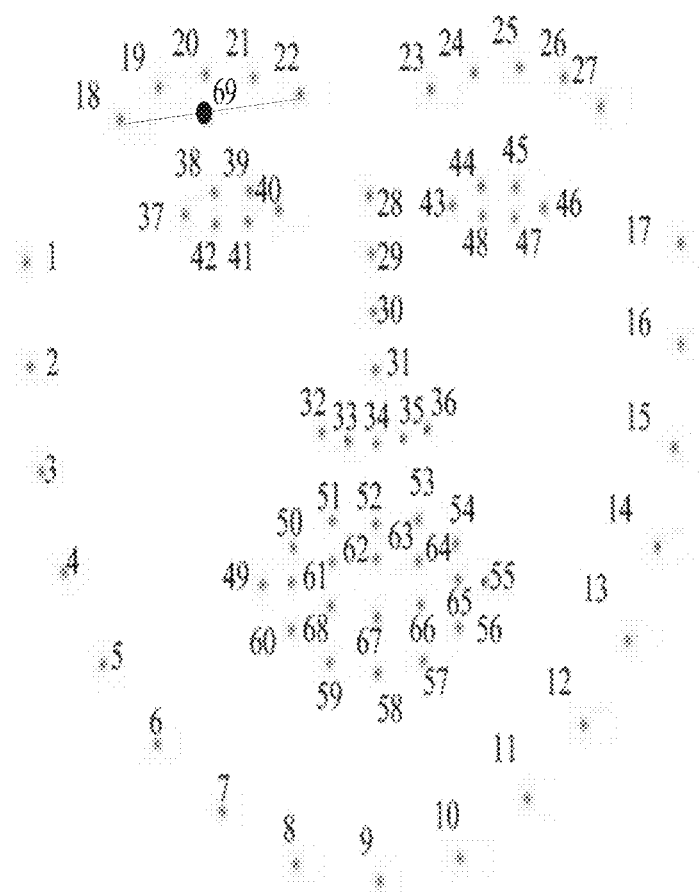
FIG. 4 is a schematic diagram of a linear interpolation in an embodiment of the present disclosure.

For example, referring to FIG. 4, the sixty-eight feature points extracted from the Dlib library are numbered 1 to 68, two feature points numbered 18 and 22 are selected from the sixty-eight feature points, the feature point numbered 18 is connected to the feature point numbered 22 to obtain a line segment, the midpoint of the line segment is determined as a feature point numbered 69.

In a second way, an intersection point of any two connection lines for connecting feature points in the first reference face image or the second reference face image is determined, as the second feature point.

Figure 5:
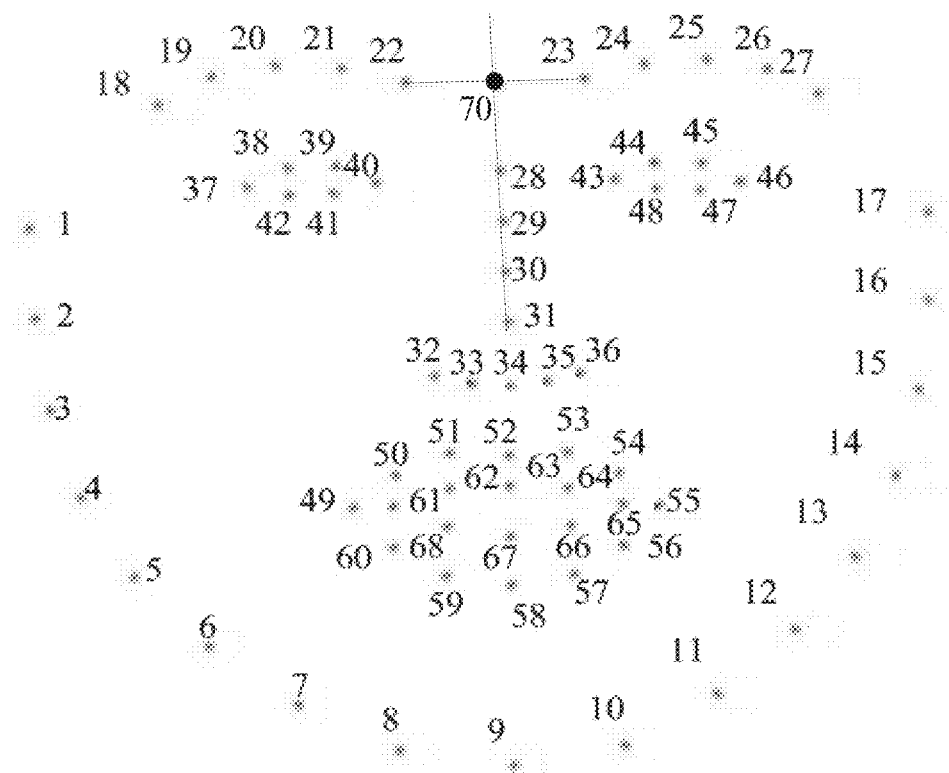
FIG. 5 is a schematic diagram of a linear interpolation in an embodiment of the present disclosure.

For example, referring to FIG. 5, four feature points, which are numbered 22, 23, 28 and 31 respectively, are selected from the sixty-eight feature points numbered 1 to 68, the feature points numbered 22 and 23 are connected to obtain a connection line 1, the feature points numbered 28 and 31 are connected to obtain a connection line 2, an intersection point of the connection line 1 and the connection line 2 is determined as the second feature point numbered 70.

In a third way, at least three non-collinear feature points are selected from the first feature points, a fitting curve corresponding to the at least three feature points is determined according to a preset fitting polynomial and the at least three feature points; and the second feature points are sampled from the fitting curve.

Figure 6:
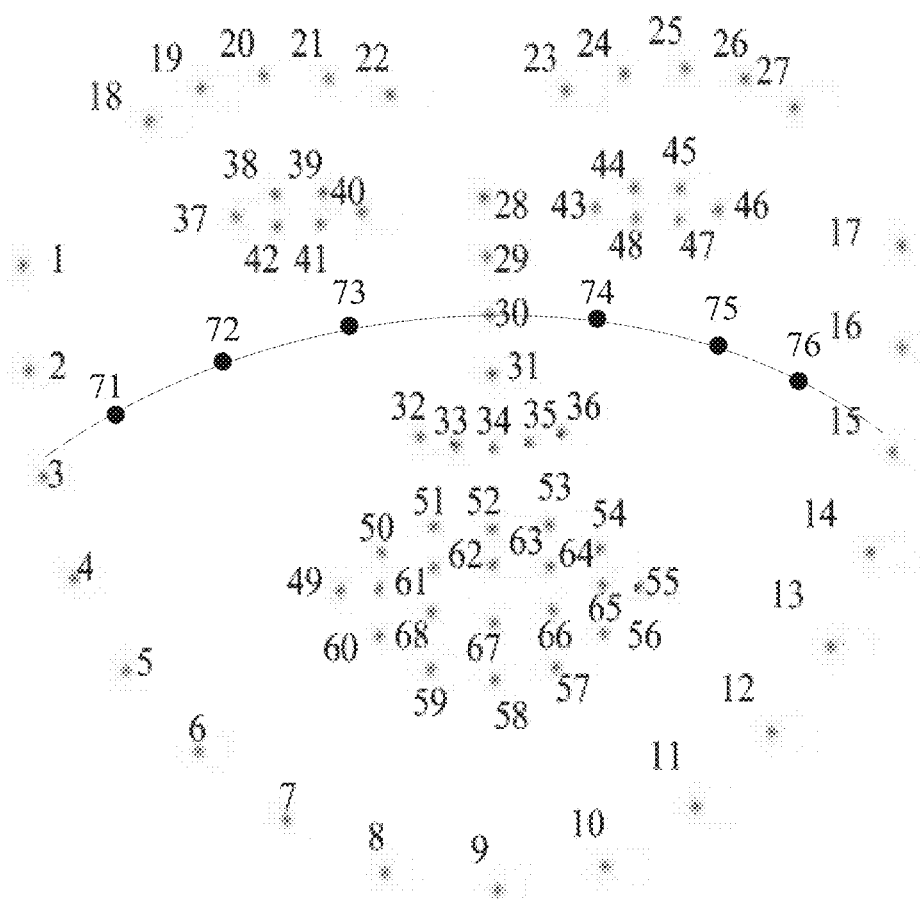
FIG. 6 is a schematic diagram of a curve interpolation in an embodiment of the present disclosure.

For example, referring to FIG. 6, three feature points numbered 3, 15 and 30 are selected from the sixty-eight feature points numbered 1 to 68, and coordinates of the three feature points numbered 3, 15 and 30 are determined, since the preset fitting polynomial is $f(x)=a*x^2+b*x+c$, where a, b and c are unknown coefficients, the coordinates of the three feature points numbered 3, 15 and 30 are brought into the preset fitting polynomial to obtain values of the coefficients a, b and c, and then the values of the coefficients a, b and c are brought into the preset fitting polynomial to obtain the fitting curve of the feature points numbered 3, 15 and 30, subsequently, six feature points are sampled from the fitting curve and numbered 71, 72, 73, 74, 75 and 76.

Further, in order to acquire more feature points in the face image, after the sixty-eight feature points are extracted according to the Dlib library, other feature points may further be acquired by using different interpolation algorithms according to different parts in the face image.

For example, if one hundred and seventy-seven feature points are selected in the face image, wherein twenty-five feature points are selected at the eyebrows, twenty-four feature points are selected at contours of eyes, forty feature points are selected at mouth, twenty-eight feature points are selected at cheek, eleven feature points are selected at chin, and twenty-three feature points are selected at forehead, respectively, so that the one hundred and seventy-seven feature points are finally selected in the face image.

Figure 7A:
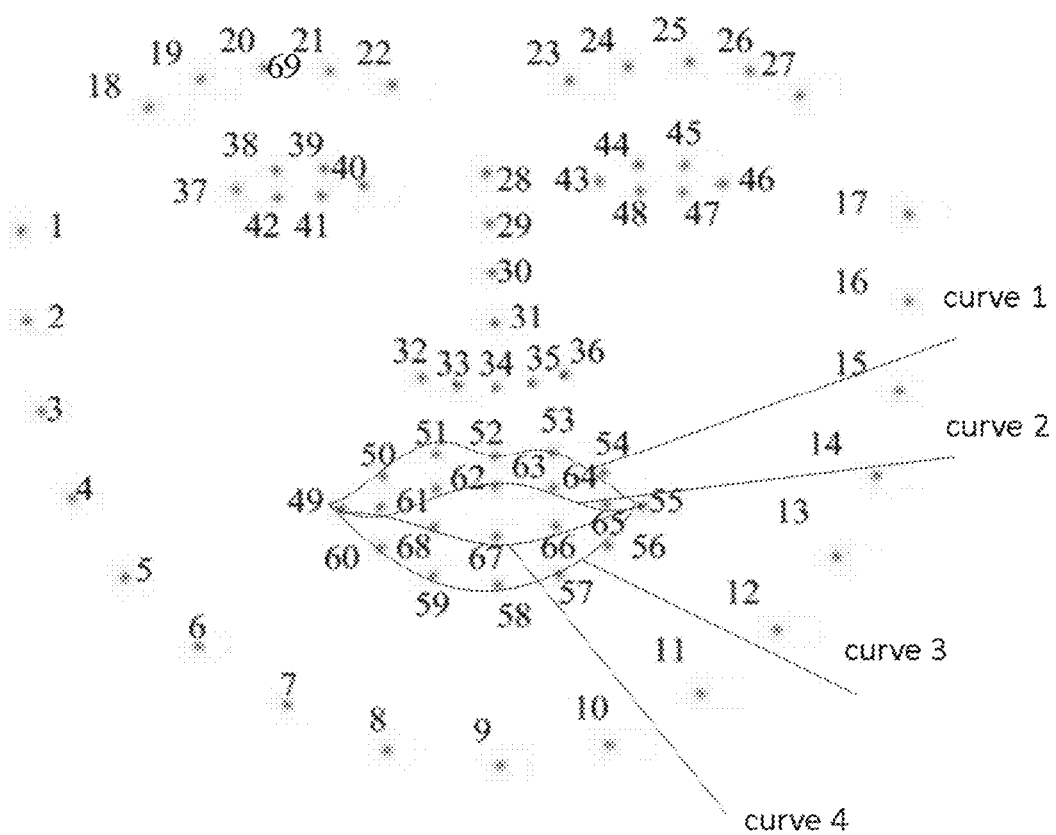
FIG. 7a is a schematic diagram of extracting feature points of a mouth in a face image according to an embodiment of the present disclosure.
Figure 7B:
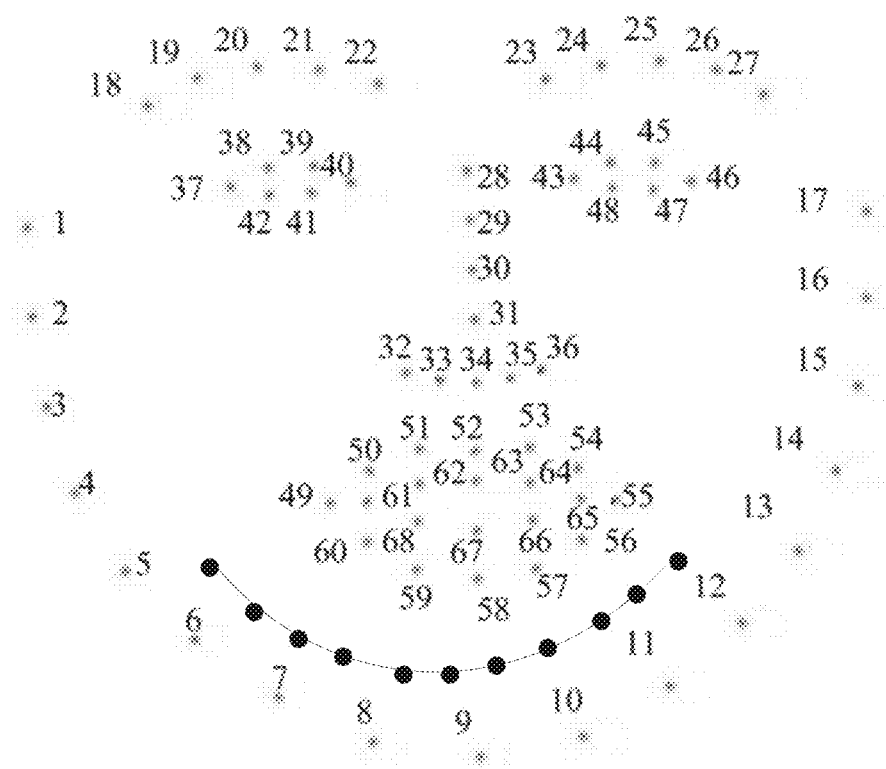
FIG. 7b is a schematic diagram of extracting feature points of a chin portion in a face image according to the embodiment of the present disclosure.
Figure 7C:
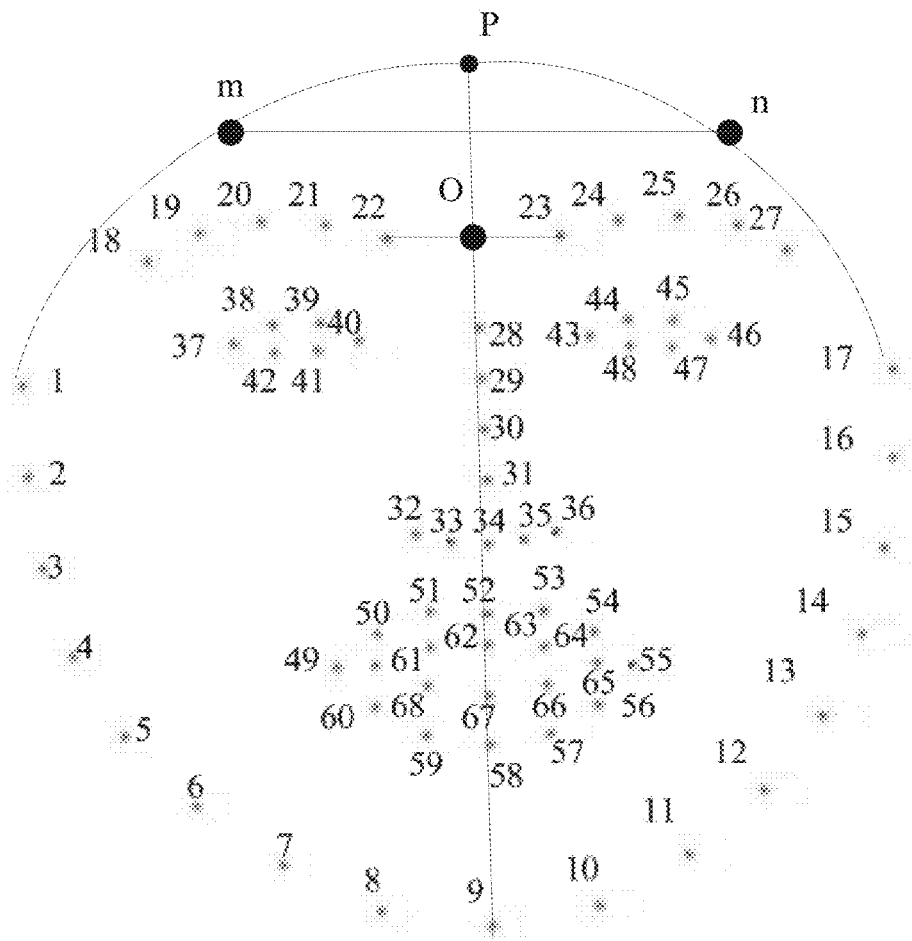
FIG. 7c is a schematic diagram of extracting feature points of a forehead position in a face image according to the embodiment of the present disclosure.

Since different parts of the face image have different contours, in order to select more feature points, feature points may be selected from different parts of the face image by using different interpolation methods, and processes of selecting feature points from different parts of the face image are described with reference to FIG. 5, FIG. 6, and. FIG. 7a to FIG. 7c.

For the eyebrows, after extracting ten feature points at the eyebrows according to the Dlib library, the method shown in FIG. 5 is adopted for acquiring another fifteen feature points at the eyebrows by means of linear interpolation, so as to acquire the twenty-five feature points at the eyebrows; for the contours of eyes, after twelve feature points at the contours of eyes are extracted according to the Dlib library, another twelve feature points are acquired at the contours of eyes by means of curve fitting interpolation, so as to acquire the twenty-four feature points at the contours of eyes; for the cheek, no feature points are extracted according to the Dlib library, a quadratic curve fitting is performed through a contour of cheek and the feature points extracted on the nose by adopting the method shown in FIG. 6, and twenty-eight feature points are selected on the fitting curve; for the mouth, referring to FIG. 7a, after twenty feature points of the mouth are exacted according to the Dlib library, four fitting curves are obtained for the mouth by means of curve fitting, including two fitting curves of an upper lip (curve 1 and curve 2, respectively) and two curves of a lower lip (curve 3 and curve 4, respectively), then sampling is performed on the curves 1, 2, 3 and 4, and finally forty feature points of the mouth are obtained; for the chin, referring to FIG. 7b, a fitting curve 5 located at the chin is obtained through the feature points of the contour of cheek, and eleven feature points are selected on the fitting curve 5; for the forehead, a ratio of a distance from a center of the forehead to a center of the eyebrows to a distance from the center of the eyebrows to a center of the chin is 5:12, referring to FIG. 7c, the feature points numbered 22 and 23 are connected, a midpoint of a connection line for connecting the feature points numbered 22 and 23 is determined to be a point O, the point O is the center of the eyebrows, a distance from the point O to the center of the chin (i.e., a distance from the point O to the feature point numbered 9) is calculated, the point P is determined according to the distance from the point O to the feature point numbered 9, so that a ratio of a distance from the point P to the point O to the distance from the point O to the feature point numbered 9 is 5:12, after the point P is obtained, a fitting curve passing through the point P, the feature point numbered 1 and the feature point numbered 17 is determined based on such three points, a plurality of feature points are collected on the fitting curve, then linear interpolation is performed according to the plurality of feature points collected on the fitting curve, for example, two feature points collected on the fitting curve are connected to obtain a line segment, and sampling is performed on the line segment, so that the plurality of feature points are obtained. That is to say, a plurality of feature points of the forehead are obtained by using curve fitting interpolation and straight line interpolation.

Further, after the feature points in the first reference face image and the second reference face image are extracted, the face deformation information between the first reference face image and the second reference face image is determined according to the extracted feature points. Specifically, there are various ways of determining the face deformation information between the first reference face image and the second reference face image based on the feature points, and one way is taken as an example for the following description.

For example, the determining the face deformation information between the first reference face image and the second reference face image based on the feature points includes:

determining a first feature vector corresponding to the first reference face image based on the feature points corresponding to the first reference face image, and determining a second feature vector corresponding to the second reference face image based on the feature points corresponding to the second reference face image;

determining a difference value between the first feature vector and the second feature vector, and obtaining the face deformation information based on the difference value.

For example, the face deformation information may be a face deformation vector. coordinates of the feature points in the first reference face image and the second reference face image are determined under a same coordinate system, the first feature vector of the first reference face image and the second feature vector of the second reference face image are determined based on the coordinates of the feature points, and the difference value between the first feature vector and the second feature vector is calculated to obtain the face deformation vector between the first reference face image and the second reference face image.

In order to facilitate understanding of the above-mentioned process of determining the face deformation vector between the first reference face image and the second reference face image, the following description is made by way of example.

For example, one hundred and seventy-seven feature points are selected respectively from the first reference face image and the second reference face image, and numbered 1 to 177, wherein positions of the feature points numbered the same in the first reference face image and the second reference face image correspond to each other. Any feature point in the first reference face image is indicated by coordinates $(x_\mu, y_{15})$, and any feature point in the second reference face image is indicated by coordinates $(x_{21}, y_{21})$, where i may equal to 1, 2, 2, ... 177; the first feature vector $S_1=(x_{11}, y_{11}, x_{12}, y_{12}, \ldots x_{1177}, y_{1177})$ is obtained according to coordinates of all the feature points in the first reference face image, the second feature vector $S_2=(x_{21}, y_{21}, x_{22}, y_{22}, \ldots x_{2177}, y_{2177})$ is obtained according to coordinates of all the feature points in the second reference face image, and then the face deformation vector DS is obtained from a formula $DS=S_2-S_1$.

Step 104, extracting, by the electronic device, feature points in the first face image, and generating a second face image based on the face deformation information and the feature points in the first face image, wherein the second face image is matched with the target facial expression information.

Specifically, after determining the face deformation information between the first reference face image and the second reference face image, the electronic device extracts the feature points in the first face image, wherein the number of the feature points extracted in the first face image is the same as the number of the feature points extracted in the first reference face image, the positions of the feature points numbered the same in the face images correspond to each other, and then the second face image is generated based on the face deformation information and the feature points in the first face image.

Further, there are various ways of generating the second face image based on the face deformation information and the feature points in the first face image, and the following description will be given by taking one way as an example.

For example, the generating the second face image based on the face deformation information and the feature points in the first face image includes: adjusting positions of the feature points in the first face image based on the face deformation information; and generating the second face image according to the feature points subjected to the adjusting.

Further, the adjusting the positions of the feature points in the first face image according to the face deformation information includes:

performing affine transformation on the feature points in the first face image by taking the first reference face image as a reference, and aligning the feature points at corresponding positions in the first face image and the first reference face image;

determining positions of the feature point in the first face image subjected to the aligning, so that the positions of the feature points in the first face image subjected to the aligning are adjusted based on the face deformation information.

A feature vector corresponding to the first face image is determined based on the feature points extracted in the first face image, and the feature vector corresponding to the first face image is converted into the first feature vector corresponding to the first reference face image through rotation and translation by taking the first reference face image as a reference.

There are various methods for performing affine transformation, for example, Procrustes analysis method, or least square method.

In order to facilitate understanding of the process of affine transformation, the following description will be given by taking the Procrustes analysis method as an example.

For example, N two-dimensional images with a same target are selected, and according to the above method for extracting feature points, feature points are marked on the N images to obtain a set of training samples:

$$n = \{x_1, x_2, \ldots, x_N\}.$$

where N is a positive integer greater than 1.

Then, a mean value of each feature point in the N images is calculated by:

$$(\overline{x}_i, \overline{y}_i) = \left( \frac{1}{N} \sum_{j=1}^{2} x_{ji}, \frac{1}{N} \sum_{j=1}^{2} y_{ji} \right)$$

where i indicates the $i^{th}$ feature point; j indicates the $j^{th}$ face image; $(x_{ji}, y_{ji})$ indicates the $i^{th}$ feature point in the $j^{th}$ face image; and $(\overline{x}_1, \overline{y}_2)$ indicates mean coordinates of the $i^{th}$ feature point.

Then, the coordinates of each feature point are normalized, that is, a difference between the coordinates of each feature point and the mean coordinates thereof is calculated according to the following formula:

$$(x'_i, y'_i) = (x_{ji} - \overline{x}_i, y_{ji} - \overline{y}_i)$$

Subsequently, according to normalized data, a shape barycenter of each of the first face image and the first reference face image is calculated, and for the $i^{th}$ image, the barycenter thereof is as follows.

$$(\overline{x}_i, \overline{y}_i) = \left( \frac{1}{n} \sum_{j=1}^{2} x_{ji}, \frac{1}{n} \sum_{j=1}^{2} y_{ji} \right)$$

Standard and sample shapes are then aligned together according to the barycenter and an angle such that the Procrustes distance between such two shapes is minimized, the Procrustes distance is defined by following formula.

$$p_d^2 = \sum_{j=1}^{n} [(x_{j1} - x_{j2})^2 + (y_{j1} - y_{j2})^2]$$

Specifically, a rotation angle from the sample shape to the standard shape in each image is calculated by using the least square method, and according to the definition of the Procrustes distance, the following is calculated:

$$\min_{a,b} \sum_{j=1}^{n} \left\| \begin{bmatrix} a & -b \\ b & a \end{bmatrix} \begin{bmatrix} x_i \\ y_i \end{bmatrix} - \begin{bmatrix} c_x \\ c_y \end{bmatrix} \right\|^2$$

where a and b represent parameters of rotation transformation in the affine transformation; $c_x$ and $c_y$ indicate the mean coordinates of each feature point.

$$\begin{bmatrix} a & -b \\ b & a \end{bmatrix} = \begin{bmatrix} k\cos(\theta) & -k\sin(\theta) \\ k\sin(\theta) & k\cos(\theta) \end{bmatrix}$$

Values of a and b are obtained by performing partial derivation to the above formula.

$$\begin{bmatrix} a \\ b \end{bmatrix} = \frac{1}{\sum_j (x_i^2 + y_i^2)} \sum_j \begin{bmatrix} x_i c_x + y_i c_y \\ x_i c_y - y_i c_x \end{bmatrix}$$

The sample shape is rotationally changed according to the rotation parameters a and b to obtain a new shape aligned with the standard shape.

$$\begin{bmatrix} x` \\ y` \end{bmatrix} = \begin{bmatrix} a & -b \\ b & a \end{bmatrix} \begin{bmatrix} x \\ y \end{bmatrix}$$

That is, in the present disclosure, performing affine transformation on the feature points in the first face image by taking the first reference face image as a reference and aligning the feature points in corresponding positions of the first face image and the first reference face image is to multiply the first face image by an affine transformation matrix so as to minimize an Euclidean distance between the feature points in the corresponding positions of the first face image and the first reference face image, that is, to make the first face image approaches the first reference face image as much as possible, or make the first face image and the first reference face image as similar as possible.

The calculation of the affine transformation matrix can refer to the technical means in the related field, and is not limited here.

Further, after performing affine transformation on the first face image and aligning the first face image with the first reference face image, the feature points in the first face image are adjusted, and the second face image is generated according to the adjusted feature points, where there are multiple ways of generating the second face image according to the adjusted feature points, and the following description is given by taking one way as an example.

For example, generating the second face image according to the adjusted feature points includes:

connecting the adjusted feature points based on a triangulation algorithm to form a triangular chain network;

performing texture filling and inverse affine transformation in the triangular chain network to obtain the second face image.

Specifically, the extracted feature points are triangulated by the triangulation algorithm, for example, Delaunay triangulation algorithm, to form the triangle chain network, where the triangle chain network is composed of a plurality of triangles, then texture filling is performed on each triangle in the triangle chain network, and after the texture filling, anti-alignment transformation is performed on the triangle chain network to obtain the second face image.

In order to facilitate understanding of the above-mentioned process of synthesizing the facial expression image, the following description is made by way of example.

For example, the image shown in FIG. 2a is used as the input face image, the image shown in FIG. 2b is used as the second face image corresponding to the target facial expression information, the image shown in FIG. 2c is the first reference face image, and the image shown in FIG. 2d is the second reference face image.

Figure 8A:
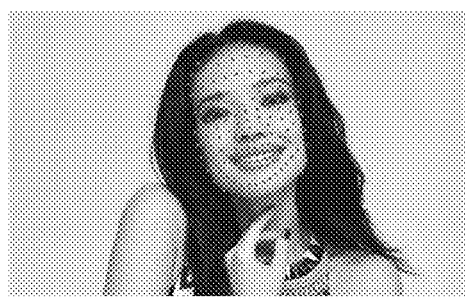
FIG. 8a is a distribution diagram of feature points of an input face image according to an embodiment of the present disclosure.
Figure 8B:
FIG. 8b is an image obtained by performing affine transformation on an input face image according to the embodiment of the present disclosure.
Figure 8C:
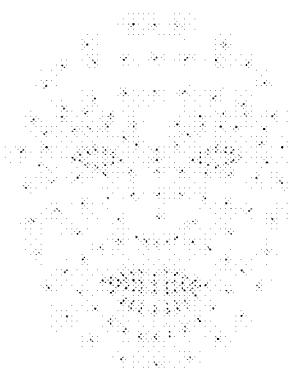
FIG. 8c is a schematic diagram of face deformation information in an embodiment of the present disclosure.
Figure 8D:
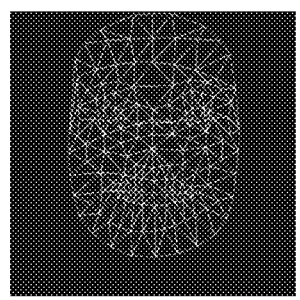
FIG. 8d is a schematic diagram of a triangular chain network formed by feature points according to an embodiment of the present disclosure.
Figure 8E:
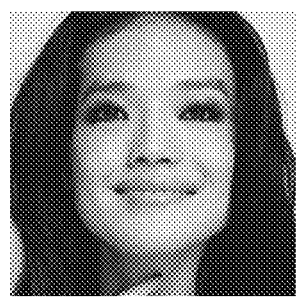
FIG. 8e is an image obtained by superimposing an input face image and face deformation information according to the embodiment of the present disclosure.

Firstly, a plurality of feature points in the face image shown in FIG. 2a is extracted to obtain the image shown in FIG. 8a, wherein FIG. 8a shows a distribution diagram of the feature points of the input face image; then, affine transformation is performed on the face image shown in FIG. 2a and the face image shown in FIG. 2c, and referring to FIG. 8b, a face image aligned with the face image shown in FIG. 2c is obtained; then, a plurality of feature points in the face images respectively shown in FIGS. 2c and 2d are extracted, the face deformation information shown in FIG. 8c is obtained based on the plurality of feature points in the face images shown in FIGS. 2c and 2d, the face image shown in FIG. 8b and the face deformation information shown in FIG. 8c are merged, the feature points are triangulated to obtain the triangular chain network shown in FIG. 8d, texture filling is performed in each triangle of the triangular chain network shown in FIG. 8d to obtain the face image shown in FIG. 8e, and finally, the face image shown in FIG. 8e is subjected to anti-alignment transformation to obtain the face image shown in FIG. 2b.

In the technical solution provided by the embodiment of the present application, the facial expression information of the input first face image and the target facial expression information are determined, the first reference face image matched with the facial expression information of the first face image and the second reference face image matched with the target facial expression information are selected from the face image library, then, face deformation information between the first reference face image and the second reference face image is determined according to the extracted feature points, and the second face image matched with the target facial expression information is generated according to the face deformation information and the feature points of the first face image. Therefore, in the technical solution provided by the embodiment of the present disclosure, two reference face images matched with the first face image inputted and the target facial expression information are selected from the face image library, and the second face image is generated based on the face deformation information between the two reference face images and the first face image inputted, avoiding manual selection of feature points and manual dividing of facial area, therefore an efficiency for generating the face image is improved, and the quality of the generated face image is improved.

In addition, in the technical solution provided by the embodiment of the present disclosure, firstly, the feature points of the contour of the facial organ in the face image are extracted based on the Dlib library, and then, the feature points of other areas except the contour of the facial organ in the face image are extracted according to the extracted feature points and the interpolation algorithm, so that the number of the extracted feature points is increased, the details of the generated face image are increased, and the quality of the generated face image is improved.

Figure 9:
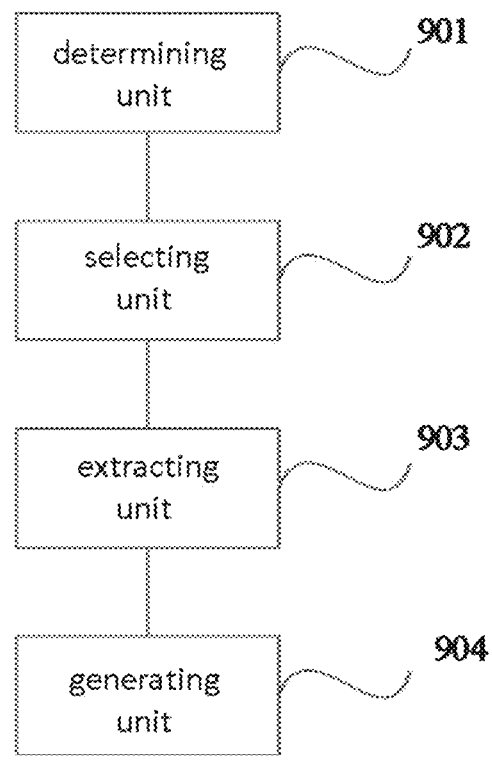
FIG. 9 is a schematic structural diagram of a device for generating a face image according to an embodiment of the present disclosure.

An embodiment of the present disclosure provides a device for generating a face image, and referring to FIG. 9, the device includes:

a determining unit 901 configured to receive a first face image inputted and target facial expression information, and determine first facial expression information corresponding to the first face image;

a selecting unit 902 configured to select, from a face image library, a first reference face image matched with the first facial expression information and a second reference face image matched with the target facial expression information based on the first facial expression information and the target facial expression information;

an extracting unit 903 configured to extract feature points in the first reference face image and the second reference face image, respectively, and determine face deformation information between the first reference face image and the second reference face image based on the feature points;

a generating unit 904 configured to extract feature points in the first face image, and generate a second face image based on the face deformation information and the feature points in the first face image, wherein the second face image is matched with the target facial expression information.

In some implementations, the determining unit 901 is configured to:

generate a feature vector corresponding to the first face image according to the feature points in the first face image;

determine first facial expression information, which corresponds to the feature vector corresponding to the first face image, based on a preset relationship between the feature vector and the facial expression information.

In some implementations, the extracting unit 903 is configured to:

respectively extract first feature points in the first reference face image and the second reference face image based on a Dlib library, wherein the first feature points refer to feature points representing a contour of a facial organ of a face;

respectively extracting second feature points in the first reference face image and the second reference face image according to the first feature points and an interpolation algorithm, wherein the second feature points are different from the first feature points.

In some implementations, the extracting unit 903 is configured to:

determine a connection line for connecting any two of the first feature points in the first reference face image or the second reference face image, determining a midpoint of the connection line as the second feature point; or determining an intersection point of any two connection lines for connecting the first feature points in the first reference face image or the second reference face image, as the second feature point; or selecting at least three non-collinear feature points from the first feature points, and determining a fitting curve corresponding to the at least three feature points according to a preset fitting polynomial and the at least three feature points; and sampling on the fitting curve to obtain the second characteristic points.

In some implementations, the determining unit 901 is configured to:

determining a first feature vector corresponding to the first reference face image based on the feature points corresponding to the first reference face image, and determining a second feature vector corresponding to the second reference face image based on the feature points corresponding to the second reference face image;

determining a difference value between the first feature vector and the second feature vector, and obtaining the face deformation information based on the difference value.

In some implementations, the generating unit 904 is configured to:

adjusting positions of the feature points in the first face image based on the face deformation information;

generating the second face image according to the adjusted feature points.

In some implementations, the generating unit 904 is configured to:

performing affine transformation on the feature points in the first face image by taking the first reference face image as a reference, and aligning the feature points at corresponding positions of the first face image and the first reference face image;

determining the positions of the feature points in the first face image subjected to the aligning, and adjusting the positions of the feature points in the first face image subjected to the aligning based on the face deformation information.

In some implementations, the generating unit 904 is configured to:

connecting the adjusted feature points based on a triangulation algorithm to form a triangular chain network;

performing texture filling and inverse affine transformation in the triangular chain network to obtain the second face image.

Figure 10:
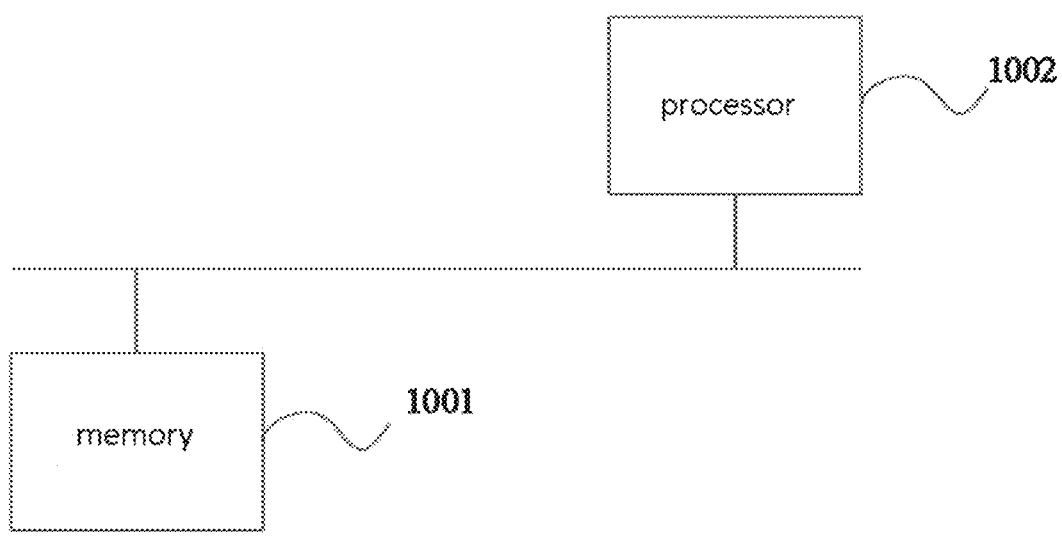
FIG. 10 is a schematic structural diagram of an electronic device according to an embodiment of the present disclosure.

The present disclosure provides an electronic device, and referring to FIG. 10, the electronic device includes:

a memory 1001 configured to store instructions executed by at least one processor;

a processor 1002 configured to execute instructions stored in the memory to perform the method for generating the face image in the above-described embodiment.

The present disclosure further provides a non-transitory computer-readable storage medium storing computer instructions, which when executed on a computer, cause the computer to execute the method for generating the face image in the above embodiment.

As will be appreciated by those skilled in the art, embodiments of the present disclosure may be provided as a method, system, or computer program product. Accordingly, the present disclosure may take a form of an entirely hardware embodiment, an entirely software embodiment or an embodiment combining software and hardware aspects. Furthermore, the present disclosure may take a form of a computer program product embodied on one or more computer-usable storage media (including, but not limited to, disk storage, optical storage, and the like) having computer-usable program code embodied therein.

The present disclosure is described with reference to flowchart illustrations and/or block diagrams of methods, devices (systems), and computer program products according to the embodiments of the present disclosure. It will be understood that each flow and/or block of the flowchart illustrations and/or block diagrams, and combinations of flows and/or blocks in the flowchart illustrations and/or block diagrams, can he implemented by computer program instructions. These computer program instructions may be provided to a processor of a general purpose computer, special purpose computer, embedded processor, or other programmable data processing device to produce a machine, such that the instructions, which are executed via the processor of the computer or other programmable data processing device, create means for implementing the functions specified in one or more flows of the flowchart illustrations and/or one or more blocks of the block diagrams.

These computer program instructions may also be stored in a computer-readable memory that can direct a computer or other programmable data processing device to function in a particular manner, such that the instructions stored in the computer-readable memory produce an article including instruction means, and the instruction means implements the functions specified in one or more flows of the flowchart illustrations and/or one or more blocks of the block diagrams.

These computer program instructions may also be loaded onto a computer or other programmable data processing device to cause a series of operational steps to be performed on the computer or other programmable device, to produce a computer implemented process, such that the instructions which are executed on the computer or other programmable device provide steps for implementing the functions specified in one or more flows of the flowchart illustrations and/or one or more blocks of the block diagrams.

It will be apparent to those skilled in the art that various modifications and variations can be made in the present disclosure without departing from the spirit and scope of the present disclosure. Thus, such modifications and variations of the present disclosure are considered falling within the scope of claims of the present disclosure and their equivalents, the present disclosure is also intended to include such modifications and variations.

The invention claimed is:

1. A method for generating a face image, comprising:

receiving a first face image inputted and target facial expression information, and determining first facial expression information corresponding to the first face image;

selecting a first reference face image matched with the first facial expression information and a second reference face image matched with the target facial expression information from a face image library based on the first facial expression information and the target facial expression information;

respectively extracting feature points in the first reference face image and the second reference face image, and determining face deformation information between the first reference face image and the second reference face image based on the feature points; and extracting feature points in the first face image, and generating a second face image based on the face deformation information and the feature points in the first face image, wherein the second face image is matched with the target facial expression information, wherein respectively extracting feature points in the first reference face image and the second reference face image comprises:

respectively extracting first feature points in the first reference face image and the second reference face image based on a Dlib library, wherein the first feature points are the feature points representing a contour of a facial organ of a face;

respectively extracting second feature points in the first reference face image and the second reference face image according to the first feature points and an interpolation algorithm, wherein the second feature points are different from the first feature points, and wherein respectively extracting second feature points in the first reference face image and the second reference face image according to the first feature points and an interpolation algorithm comprises:

determining a connection line for connecting any two of the first feature points in the first reference face image or the second reference face image, determining a midpoint of the connection line as the second feature point; or determining an intersection point of any two connection lines for connecting the first feature points in the first reference face image or the second reference face image, as the second feature point; or selecting at least three non-collinear feature points from the first feature points, and determining a fitting curve corresponding to the at least three feature points according to a preset fitting polynomial and the at least three feature points; and sampling on the fitting curve to obtain the second characteristic points.

2. The method of claim 1, wherein determining first facial expression information corresponding to the first face image comprises:

generating a feature vector corresponding to the first face image based on the feature points in the first face image;

determining first facial expression information, which corresponds to the feature vector corresponding to the first face image, based on a preset relationship between the feature vector and the facial expression information.

3. An electronic device, comprising:
a memory configured to store instructions to be executed by at least one processor;
a processor configured to load and execute the instructions stored in memory to implement the method of claim 1.

4. A non-transitory computer-readable storage medium, storing computer instructions which, when executed on a computer, cause the computer to perform the method of claim 1.

5. The method of claim 1, wherein determining face deformation information between the first reference face image and the second reference face image based on the feature points comprises:

determining a first feature vector corresponding to the first reference face image based on the feature points corresponding to the first reference face image, and determining a second feature vector corresponding to the second reference face image based on the feature points corresponding to the second reference face image;

determining a difference value between the first feature vector and the second feature vector, and obtaining the face deformation information based on the difference value.

6. The method of claim 1, wherein generating the second face image based on the face deformation information and the feature points in the first face image comprises:

adjusting positions of the feature points in the first face image based on the face deformation information;

generating the second face image according to the feature points subjected to the adjusting.

7. A method for generating a face image, comprising:
receiving a first face image inputted and target facial expression information, and determining first facial expression information corresponding to the first face image;

selecting a first reference face image matched with the first facial expression information and a second reference face image matched with the target facial expression information from a face image library based on the first facial expression information and the target facial expression information;

respectively extracting feature points in the first reference face image and the second reference face image, and determining face deformation information between the first reference face image and the second reference face image based on the feature points; and extracting feature points in the first face image, and generating a second face image based on the face deformation information and the feature points in the first face image, wherein the second face image is matched with the target facial expression information, wherein determining face deformation information between the first reference face image and the second reference face image based on the feature points comprises:

determining a first feature vector corresponding to the first reference face image based on the feature points corresponding to the first reference face image, and determining a second feature vector corresponding to the second reference face image based on the feature points corresponding to the second reference face image;

determining a difference value between the first feature vector and the second feature vector, and obtaining the face deformation information based on the difference value.

8. An electronic device, comprising:
a memory configured to store instructions to be executed by at least one processor;
a processor configured to load and execute the instructions stored in memory to implement the method of claim 7.

9. A non-transitory computer-readable storage medium, storing computer instructions which, when executed on a computer, cause the computer to perform the method of claim 7.

10. The method of claim 7, wherein determining first facial expression information corresponding to the first face image comprises:

generating a feature vector corresponding to the first face image based on the feature points in the first face image;

determining first facial expression information, which corresponds to the feature vector corresponding to the first face image, based on a preset relationship between the feature vector and the facial expression information.

11. The method of claim 7, wherein respectively extracting feature points in the first reference face image and the second reference face image comprises:

respectively extracting first feature points in the first reference face image and the second reference face image based on a Dlib library, wherein the first feature points are the feature points representing a contour of a facial organ of a face;

respectively extracting second feature points in the first reference face image and the second reference face image according to the first feature points and an interpolation algorithm, wherein the second feature points are different from the first feature points.

12. The method of claim 11, wherein generating the second face image based on the face deformation information and the feature points in the first face image comprises:

adjusting positions of the feature points in the first face image based on the face deformation information;

generating the second face image according to the feature points subjected to the adjusting.

13. The method of claim 7, wherein generating the second face image based on the face deformation information and the feature points in the first face image comprises:
adjusting positions of the feature points in the first face image based on the face deformation information;
generating the second face image according to the feature points subjected to the adjusting.

14. A method for generating a face image, comprising:
receiving a first face image inputted and target facial expression information, and determining first facial expression information corresponding to the first face image;
selecting a first reference face image matched with the first facial expression information and a second reference face image matched with the target facial expression information from a face image library based on the first facial expression information and the target facial expression information;
respectively extracting feature points in the first reference face image and the second reference face image, and determining face deformation information between the first reference face image and the second reference face image based on the feature points; and
extracting feature points in the first face image, and generating a second face image based on the face deformation information and the feature points in the first face image, wherein the second face image is matched with the target facial expression information,
wherein generating the second face image based on the face deformation information and the feature points in the first face image comprises:
adjusting positions of the feature points in the first face image based on the face deformation information;
generating the second face image according to the feature points subjected to the adjusting, and
wherein adjusting the positions of the feature points in the first face image based on the face deformation information comprises:
performing affine transformation on the feature points in the first face image by taking the first reference face image as a reference, and aligning the feature points at corresponding positions of the first face image and the first reference face image;
determining the positions of the feature points in the first face image subjected to the aligning, and adjusting the positions of the feature points in the first face image subjected to the aligning based on the face deformation information.

15. The method of claim 14, wherein generating the second face image according to the feature points subjected to the adjusting comprises:

connecting the feature points subjected to the adjusting based on a triangulation algorithm to form a triangular chain network;
performing texture filling and inverse affine transformation in the triangular chain network to obtain the second face image.

16. An electronic device, comprising:
a memory configured to store instructions to be executed by at least one processor;
a processor configured to load and execute the instructions stored in memory to implement the method of claim 14.

17. A non-transitory computer-readable storage medium, storing computer instructions which, when executed on a computer, cause the computer to perform the method of claim 14.

18. The method of claim 7, wherein determining first facial expression information corresponding to the first face image comprises:
generating a feature vector corresponding to the first face image based on the feature points in the first face image;
determining first facial expression information, which corresponds to the feature vector corresponding to the first face image, based on a preset relationship between the feature vector and the facial expression information.

19. The method of claim 14, wherein determining face deformation information between the first reference face image and the second reference face image based on the feature points comprises:
determining a first feature vector corresponding to the first reference face image based on the feature points corresponding to the first reference face image, and determining a second feature vector corresponding to the second reference face image based on the feature points corresponding to the second reference face image;
determining a difference value between the first feature vector and the second feature vector, and obtaining the face deformation information based on the difference value.

20. The method of claim 14, wherein respectively extracting feature points in the first reference face image and the second reference face image comprises:
respectively extracting first feature points in the first reference face image and the second reference face image based on a Dlib library, wherein the first feature points are the feature points representing a contour of a facial organ of a face;
respectively extracting second feature points in the first reference face image and the second reference face image according to the first feature points and an interpolation algorithm, wherein the second feature points are different from the first feature points.

* * * * *